3,047,635
PREPARATION OF POLYHYDRIC ALCOHOLS
Leo Kasehagen, West Chester, Pa., assignor to Atlas Chemical Industries, Inc., Wilmington, Del., a corporation of Delaware
No Drawing. Filed May 13, 1959, Ser. No. 812,824
6 Claims. (Cl. 260—635)

This invention relates to the production of polyhydric alcohols and more particularly to a process for converting one acyclic polyhydric alcohol to one or more isomers thereof.

An acyclic polyhydric alcohol of the generic formula $C_nH_{n+2}(OH)_n$, wherein $n$ is an integer from 4 to 6 and the hydroxyls are distributed one to each carbon atom may exist in one of a number of isomeric forms. Thus, there are ten known hexahydric alcohols, wherein $n$ of the foregoing formula is 6, of which the better known members include sorbitol, mannitol, dulcitol, iditol, tallitol and allitol. The pentitols, arabitol and xylitol and the tetritols, erythritol and threitol, have been described in the literature.

It has now been found, in accordance with this invention, that any of the polyols of the generic formula shown will undergo an isomeric transformation when treated under conditions to be described hereinafter, to yield one or more different polyols of the same empirical formula in substantial quantity. It is thus possible to prepare a polyol corresponding to a rare and difficultly available sugar, employing as the starting material a more readily available sugar, reducing it to the corresponding alcohol and subjecting the latter to the isomerization process of the invention.

The invention may also be utilized to increase the recovered yield of one isomeric polyol at the expense of another when both are formed by the reduction of a single sugar. For example when invert sugar is reduced both sorbitol and mannitol are produced, the former in predominating quantity. The major proportion of the mannitol may readily be crystallized from the sorbitol leaving a mother liquor containing sufficient residual mannitol that it does not yield a satisfactory sorbitol product on evaporation. Upon isomerization of the mother liquor additional mannitol is formed therein at the expense of sorbitol and another strike of mannitol crystals can be obtained. This process may be repeated, if desired, a number of times, whereby the yield of crystalline mannitol from a given quantity of reduction product is increased and the amount of impure sorbitol product to be disposed of is decreased.

In accordance with the invention an acyclic polyhydric alcohol containing from 4 to 6 carbon atoms and one hydroxyl group directly attached to each carbon atom is isomerized by subjecting it, in solution, to the action of hydrogen under pressure and in the presence of a hydrogenating catalyst at an elevated temperature while maintaining the pH in the range of from about 7 to about 11.

More particularly, the polyhydric alcohol is dissolved in water, an alcohol of from 1 to 4 carbon atoms or a glycol of from 2 to 4 carbon atoms, the pH is adjusted, if necessary, to a pH between about 7 and about 11, a hydrogenation catalyst is added and the mixture heated to a temperature of from 160° C. to 200° C. under a hydrogen pressure of from 500 to 3000 pounds per square inch for a period of at least a half hour. The heating is discontinued before any substantial hydrogen absorption takes place since such absorption would signify dehydroxylation and/or hydrogenolysis of the polyhydric material. It has been found that, in the temperature and pressure ranges recited, the isomerization reaction reaches virtual equilibrium before any substantial absorption of hydrogen is noted. At the upper end of the temperature range and with a highly active catalyst the heating should be discontinued soon after the minimum time of a half hour, above recited. At lower temperatures and/or with less active catalyst, longer periods of time, up to 4 or even 6 hours, may be employed before substantial hydrogen uptake is noted.

At the end of the indicated heating period the reaction mixture is cooled and the polyol solution is separated from the hydrogenation catalyst and hydrogen gas. The resulting mixture of isomeric polyols in solution may be worked up as desired. Conventional methods for recovering individual polyhydric alcohols from their mixtures, such as direct crystallization, fractional distillation, formation of chemical derivatives for separative crystallization and/or distillation, differential adsorption (chromatography) are known to those skilled in the art of carbohydrate chemistry and in the technology of sugar derivatives, and may be applied to the isomerization products of this invention as necessary to recover the desired products therefrom.

In carrying out the process of this invention any suitable hydrogenation catalyst may be employed. Reference is made, for example, to United States Patent No. 1,963,999 for a list of metals which in their reduced form are hydrogenation catalysts and may be employed in the practice of the invention. Oxide catalysts of the type of copper chromite are also known hydrogenating catalysts and may be employed. The base metal catalysts are preferred. Particularly preferred is a base metal catalyst, especially nickel or cobalt, supported on an inert carrier such as alumina, diatomaceous earth, silica, activated carbon or the like. The ratio of catalyst (active component) to polyhydric alcohol in the isomerizing mixture may vary over a considerable range depending on the activity of the catalyst, the particular polyol under consideration, the time-temperature schedule of operation desired and the pressure employed. When employing the preferred supported nickel catalyst the presence of as little as 0.5% by weight nickel based on the polyhydric alcohol will promote the isomerization although in the interest of economy of time in the autoclave it is preferred to use larger amounts such, for example, as 1% to 6%. With less active catalysts larger proportions, up to 10% or even 20% of catalyst, based on the polyol may be employed.

The isomerization process of the invention is carried out with the polyhydric alcohol in solution. The solvent may be water, an aliphatic monohydric alcohol containing from 1 to 4 carbon atoms, or a glycol containing from 2 to 4 carbon atoms. The concentration of polyhydric alcohol in the solvent may vary widely. In general concentrations ranging from 25% to 75% are usefully employed, the preferred range being from 50% to 70%.

Operable rates of isomerization are noted when the hydrogen pressure is as low as 500 pounds per square inch although it is preferred to use pressures upwards of 1000 pounds in the interest of more rapid reaction. There is no upper limit on the hydrogen pressure which may be employed but the gain in reaction efficiency does not increase markedly as the pressure is raised above 2000 pounds, and the mechanical difficulties encountered in operation at pressures above 3000 pounds are not compensated by any gain in performance. The preferred range of hydrogen pressures for practice of the invention is from 1000 to 2000 pounds per square inch.

The isomerization is carried out at temperatures above 160° C. to obtain usefully rapid rates of reaction and below 200° C. to avoid dehydroxylation and hydrogenolysis reactions. The preferred temperature range is from 170° C. to 190° C.

It is critical, in the isomerization process of the reaction, that the pH be at least about 7. If the slurry of catalyst and polyol solution is acidic the pH may be adjusted by the addition of a soluble alkaline substance such, for example, as an alkali or alkaline earth metal hydroxide or carbonate, or the salt of a strong base and weak acid, such as sodium acetate, or the like. Strongly alkaline solutions, i.e., pH values above about 11, are to be avoided during the isomerization process lest undesirable side reactions be initiated. Preferably the pH is maintained in the range of about 7 to about 9.

The following examples are presented to illustrate specific procedures for carrying out the process of the invention.

Example I 286 grams (1.1 mols) of a 70% solution of sorbitol in water were mixed with a sufficient quantity of kieselguhr supported nickel catalyst under nitrogen to yield a slurry containing 2% nickel based on polyol solids. The resulting slurry (pH 8.8) was charged into a 1-liter stainless steel stirred autoclave, purged with nitrogen and pressured with hydrogen to 1300 pounds per square inch (gauge). The autoclave and its contents were then heated to 170° C. in 35 minutes and held at that temperature for 2 hours. The pressure rose to 2000 pounds due to the temperature increase and remained substantially constant during the 2 hour period. The autoclave was then cooled, the pressure released and the contents discharged. After filtration, the solution was subjected to chromatographic analysis and found to contain, per 100 parts of solids, 55 parts sorbitol, 23 parts mannitol and 22 parts iditol.

Example II

The procedure of Example I was repeated with the exception that the heating was discontinued after 1 hour. The isomerized mixture yielded the following analysis: 85 parts sorbitol, 11 parts mannitol, 1 part iditol.

Example III

The process of Example II was repeated except that the temperature was raised to 190° C. instead of 170° C. At this higher temperature after 1 hour's isomerization the product distribution was 53 parts sorbitol, 20 parts mannitol, 26 parts iditol.

Examples IV to VI

The process of Example I was repeated with the exception that the hydrogen pressure was varied as indicated in the following table. The extents of isomerization were as tabulated.

| Ex. No. | Hydrogen Pressure, lbs./in.$^2$ | Product Distribution Found | | |
|---|---|---|---|---|
| | | Percent Sorbitol | Percent Mannitol | Percent Iditol |
| IV | 460 | 63 | 13 | 17 |
| V | 1,220 | 56 | 18 | 19 |
| VI | 2,600 | 54 | 17 | 23 |

Example VII

The process of Example I was repeated except that the pH of the slurry before isomerization was reduced to about 7 (actually determined pH=6.9) by the addition of diluted phosphoric acid. Isomerization, though less rapid than at the higher pH, was substantial. The product distribution found by analysis was 69% sorbitol, 11% mannitol and 15% iditol.

By contrast when the pH was decreased to 5.2 almost no isomerization took place. By analysis there was found 91% sorbitol, 4% mannitol and no measurable quantity of iditol.

Isomerization of sorbitol to yield mannitol employing other solvents and catalysts is illustrated in the following examples.

Example VIII

A supported cobalt catalyst was introduced into a 70% (aqueous) sorbitol solution in quantity to produce a slurry containing 6% by weight of cobalt based on the sorbitol content. The mixture was treated in the apparatus described in Example I for 2 hours at 190° C. and 2000 pounds' pressure. The resulting product contained 14% mannitol on the polyol solids.

Example IX

A mixture of 100 parts sorbitol, 184 parts ethyl alcohol and 10 parts copper-chromium oxide catalyst was isomerized for 1 hour at 200° C. The resulting product contained 14% mannitol on the basis of solid polyols.

Example X

A mixture of 100 parts sorbitol, 100 parts ethylene glycol and sufficient supported nickel catalyst to yield 2 parts nickel was isomerized for 2 hours at 170° C. and 2000 pounds hydrogen pressure. 12% mannitol and 11% iditol (based on polyhydric alcohol solids) were isolated from the resulting product.

The isomerization of polyols other than sorbitol is illustrated in the following examples.

Examples XI to XIV

To a 35% aqueous slurry of mannitol sufficient supported nickel catalyst to yield 2% nickel based on the mannitol was added. Separate portions of the resulting slurry were isomerized at 170° C. and 1900 pounds hydrogen pressure for the different lengths of time indicated in the following table. The extents of isomerization were as indicated in the table.

| Ex. No. | Time of Isomerization, hours | Product Distribution | | |
|---|---|---|---|---|
| | | Percent Mannitol | Percent Sorbitol | Percent Iditol |
| XI | 1 | 65 | 30 | 0 |
| XII | 2 | 62 | 37 | 0 |
| XIII | 3 | 48 | 34 | 9 |
| XIV | 4 | 46 | 38 | 14 |

Example XV

A 35% aqueous slurry of 400 grams dulcitol, and sufficient supported nickel catalyst to yield 6% nickel on the dulcitol was isomerized at 170° C. under 1900 pounds' hydrogen pressure for 4 hours. After filtration of the product to remove the catalyst 400 ml. 95% ethanol was added and crystallization allowed to proceed for 48 hours at 0° C. to remove unisomerized dulcitol. Approximately 30% of the starting material was so recovered.

From the filtrate the following hexitols were separated and identified by a combination of crystallization and derivization processes:

D,L-glucitol (sorbitol)    D,L-mannitol
D,L-tallitol               Allitol

Example XVI

A 50% aqueous solution of erythritol slurried with sufficient supported nickel catalyst to yield 4% nickel based on the erythritol was isomerized for 4 hours at 190° C. under 1800 pounds hydrogen pressure. After filtering out the catalyst approximately 40% of unconverted erythritol was recovered by crystallization from aqueous and aqueous methanol solutions. The 60% tetritol remaining in the filtrate was identified as D,L-threitol by conversion to its dibenzylidene derivative and comparison of the product with the corresponding derivative of an authentic sample of D,L-threitol.

The process of the invention may be carried out in continuous as well as in batch operation as is illustrated in the following example.

Example XVII

The starting material was the polyol syrup obtained as mother liquor after crystallizing mannitol from the hydrogenation product of invert sugar. Its total solids content was 70%, which solids comprised 91.5% sorbitol and 8.5% mannitol. Separation and recovery of this small amount of mannitol from the polyhydric alcohol syrup is not economically feasible and its presence detracts from the commercial value of the syrup.

To the 70% syrup described there was added 0.05% by weight (based on polyol solids) of calcium carbonate and sufficient kieselguhr-supported nickel catalyst to furnish 2% nickel (on polyol solids). The pH of the slurry was 7.6. The slurry was fed through a continuous hydrogenation reactor consisting of 4 vertical cylinders of 8.7 liters capacity each, arranged in series, together with hydrogen gas under pressure. The liquid feed rate was 8.7 liters per hour so that the contact time in the reaction system was 4 hours. A temperature of 170° C. and a hydrogen pressure of 2000 pounds was maintained in the reactors. Hydrogen was circulated at a rate of 1000 standard cubic feet per hour.

The effluent from the reactors was cooled, depressured and separated from the catalyst by filtration. The solids content of the filtrate had the following analysis:

| | Percent |
|---|---|
| Sorbitol | 48.1 |
| Iditol | 23.0 |
| Mannitol | 28.9 |

Thus, a substantial quantity of crystallizable mannitol is produced from the original polyhydric alcohol mixture. The uncrystallizable sorbitol-iditol mixture is suitable for repeated recycling through the isomerization reactor (in admixture with more of the original sorbitol-mannitol mixture if desired) whereby further quantities of crystallizable mannitol may be obtained.

What is claimed is:

1. The process of isomerizing an acyclic polyhydric alcohol containing from 4 to 6 carbon atoms and one hydroxyl group attached directly to each carbon atom which comprises preparing a solution of said polyhydric alcohol in a solvent selected from the group consisting of water, aliphatic monohydric alcohols containing from 1 to 4 carbon atoms, and glycols containing from 2 to 4 carbon atoms, heating the resulting solution in the presence of a hydrogenation catalyst selected from the group consisting of supported nickel, supported cobalt and copper-chromium oxide catalysts at a temperature of from 160° C. to 200° C., under a hydrogen pressure of from 500 to 3000 pounds per square inch, for at least a half hour while maintaining the pH of the said solution in the range of from about 7 to about 11, discontinuing the said heating before any absorption of hydrogen has taken place, cooling the reaction mixture and separating the resulting solution of isomerized polyhydric alcohols from the hydrogenation catalyst.

2. The process of claim 1 wherein the said polyhydric alcohol is a hexitol.

3. The process of isomerizing a hexitol which comprises heating an aqueous solution of said hexitol in the presence of a hydrogenation catalyst selected from the group consisting of supported nickel, supported cobalt and copper-chromium oxide catalysts at a temperature of from 160° C. to 200° C. under a hydrogen pressure of from 500 to 3000 pounds per square inch, for at least a half hour while maintaining the pH of the said solution in the range of about 7 to about 11, discontinuing the heating before any absorption of hydrogen has taken place, cooling the reaction mixture and separating the resulting solution of hexitol isomers from the hydrogenation catalyst.

4. The process of isomerizing a hexitol which comprises heating an aqueous solution containing from 25% to 75% by weight of said hexitol, in the presence of from 0.5% to 20% by weight, based on said hexitol of a hydrogenation catalyst selected from the group consisting of supported nickel, supported cobalt and copper-chromium oxide catalysts, at a temperature of from 160° C. to 200° C. under a hydrogen pressure of from 500 to 3000 pounds per square inch, for at least a half hour while maintaining the pH of the said solution in the range of about 7 to about 11, discontinuing the heating before any absorption of hydrogen has taken place, cooling the reaction mixture and separating the resulting solution of hexitol isomers from the hydrogenation catalyst.

5. The process of isomerizing sorbitol to a mixture of sorbitol, mannitol, and iditol which comprises heating an aqueous solution of sorbitol containing from 50% to 70% by weight of sorbitol, in the presence of sufficient supported nickel hydrogenation catalyst to yield a nickel content of from 1% to 6% based on the sorbitol, at a temperature of from 170° C. to 190° C., under a pressure of from 1000 to 2000 pounds per square inch, for at least a half hour while maintaining the pH of the said solution in the range of from about 7 to about 11, discontinuing the said heating before any absorption of hydrogen has taken place, cooling the reaction mixture and filtering the supported nickel catalyst from the resulting aqueous solution of sorbitol, mannitol and iditol.

6. The process of claim 5 wherein the said nickel content is 2% and the said heating is discontinued after 4 hours.

References Cited in the file of this patent

UNITED STATES PATENTS

| 1,990,245 | Mueller et al. | Feb. 5, 1935 |
| 2,004,135 | Rothrock | June 11, 1935 |
| 2,759,024 | Kasehagen et al. | Aug. 14, 1956 |
| 2,852,570 | Conradin et al. | Sept. 16, 1958 |